R. C. COX.
DEVICE FOR TESTING GAGES.
APPLICATION FILED DEC. 3, 1912.

1,108,141.

Patented Aug. 25, 1914.
2 SHEETS—SHEET 2.

Witnesses:
Edmund Curran
E. C. Murphy

Inventor
Richard C. Cox.
By his Attorney
Henry J. Miller

UNITED STATES PATENT OFFICE.

RICHARD C. COX, OF DORCHESTER, MASSACHUSETTS, ASSIGNOR OF ONE-HALF TO HIMSELF AND ONE-HALF TO FRANKLIN A. WYMAN, OF DORCHESTER, MASSACHUSETTS.

DEVICE FOR TESTING GAGES.

1,108,141.　　　　Specification of Letters Patent.　　Patented Aug. 25, 1914.

Application filed December 3, 1912.　Serial No. 734,666.

*To all whom it may concern:*

Be it known that I, RICHARD C. COX, of Dorchester, in the county of Suffolk and State of Massachusetts, have invented certain new and useful Improvements in Devices for Testing Gages, of which the following is a specification, reference being had to the accompanying drawings, forming part thereof.

This invention has reference to improvements in devices for testing steam and other pressure gages, particularly as to their accuracy of registration.

One object of the invention is to provide a gage testing device conveniently portable and simple and accurate in operation.

Another object of the invention is to so construct a pressure gage testing device that by a combination of relatively movable and relatively proportioned areas of compression the active compressive pressure on the gage is relatively increased.

Another object of the invention is to so construct a gage testing device of this nature that a pressure medium may be acted upon by a weighted element and that the compressive action of said weighted element shall be transmitted through a second compression element operated by or through the compression of the pressure medium.

Another object of the invention is to improve the construction of pressure exerting devices for gage testing mechanisms.

Another object is to provide an improved pump adapted for gage testing devices.

Other objects of the invention will appear from the following description.

The invention consists in the novel construction of the mechanism for exerting pressure on the testing medium usually fluid.

The invention also consists in the novel construction of the pump and its combination with the testing mechanism.

The invention also consists in such other novel features of construction and combination of parts as shall hereinafter be more fully described and pointed out in the claims.

Figure 1:
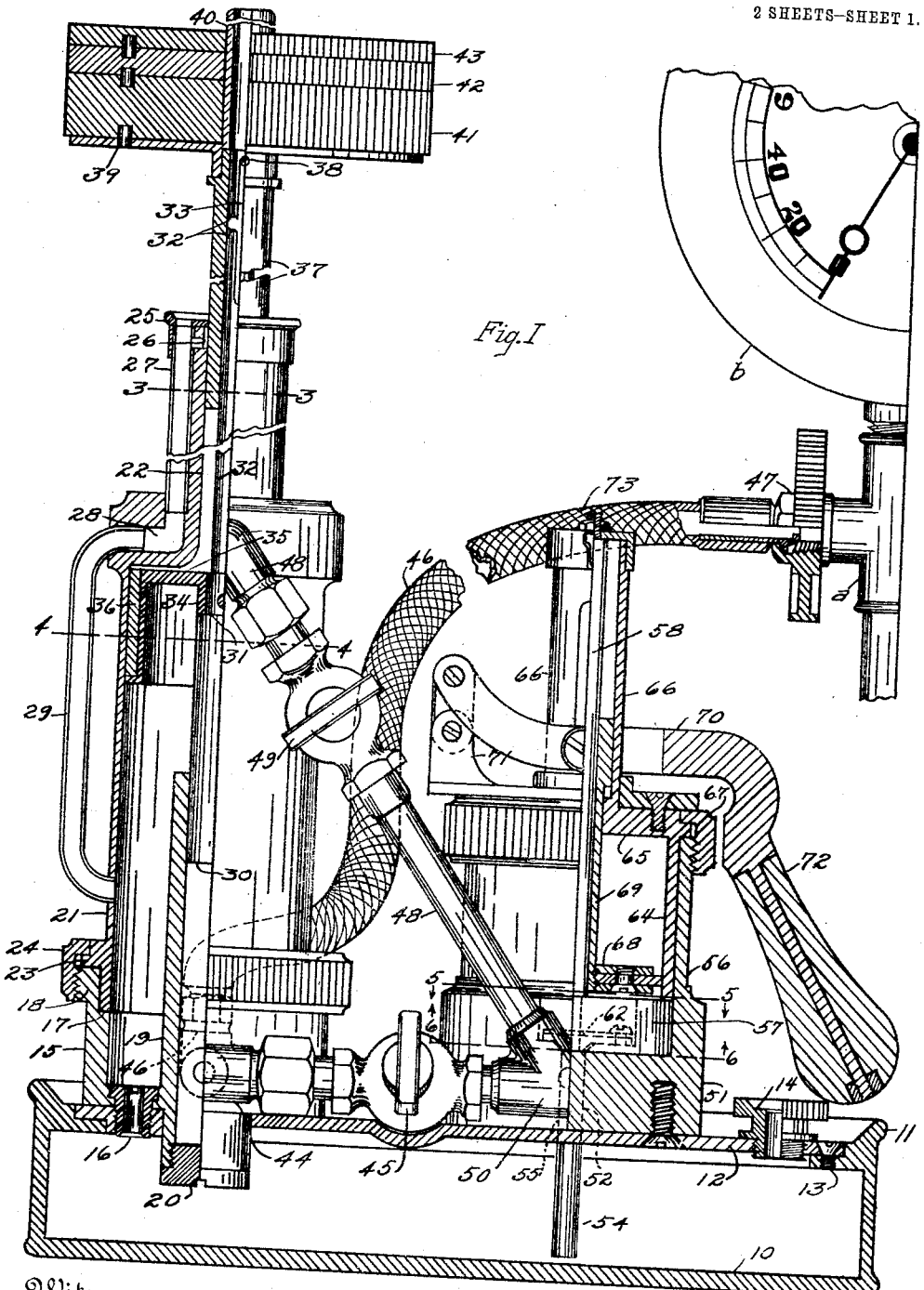
Figure 2:
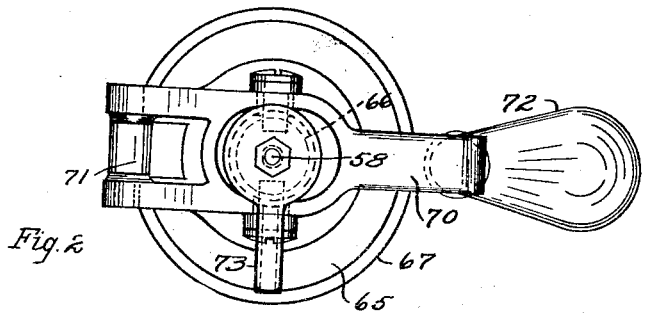
Figure 3:
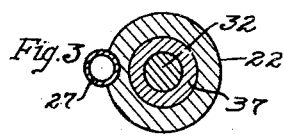
Figure 5:
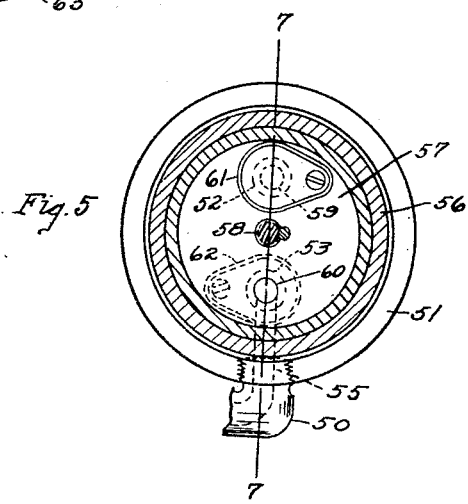
Figure 4:
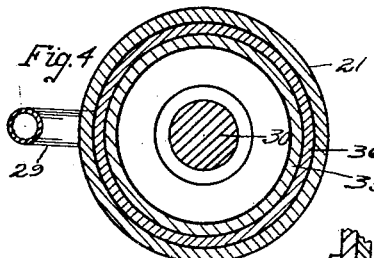
Figure 6:
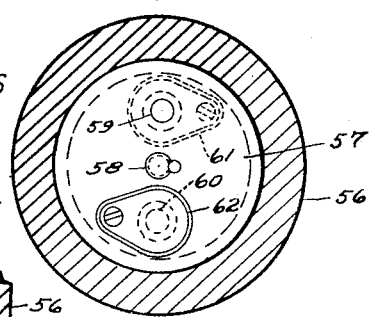
Figure 7:
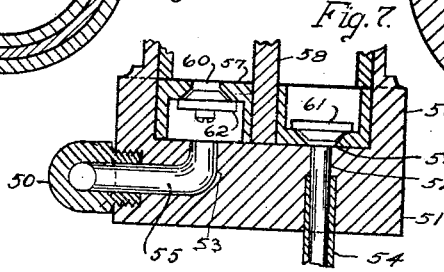

Figure 1, represents a side elevation of the improved testing machine or device, partially in vertical section, illustrating the preferred construction. Fig. 2, represents a plan view of the pump. Fig. 3, represents a sectional view taken on line 3—3 Fig. 1. Fig. 4, represents a similar view taken on line 4—4 Fig. 1. Fig. 5, represents a cross sectional view of the pump casing and its plunger head as taken on line 5—5 Fig. 1 looking downward. Fig. 6, represents a view, similar to Fig. 5, taken on line 6—6 Fig. 1, looking upward. Fig. 7, represents a sectional detail view taken on line 7—7 Fig. 5.

Similar reference characters designate corresponding parts throughout.

As shown herein in its preferred form 10 indicates a reservoir or comparatively small tank, which is preferably portable and has the lip 11 and the cover or plate 12, secured to the reservoir 10 by screws as 13, and provided with an inlet opening closed by the screw plug 14. On the plate 12 is mounted the hollow base 15 secured in position by any suitable means of which the tubular screw 16 preferably forms part. The upper portion of this base has the internal shoulder 17 and the exterior screw threaded enlargement 18 and centrally disposed in this base and preferably integral therewith is the cylinder 19 the lower end of which extends through an opening in plate 12 and is closed by the screw plug 20. Mounted on the shoulder 17 is the outer cylinder 21 which extends upward considerably above the upper end of cylinder 19 and is then contracted to form the cylindrical neck 22. At its lower end this cylinder 21 has the external shoulder 23 which is engaged by the lip of collar 24 screwed on to the enlargement 18 of chamber 15 whereby said cylinder 21 is firmly secured to said chamber. At its upper end the neck 22 has the dished cap 25 and the slight clearance 26 communicating with the duct 27 which latter receives any slight accumulation of oil, when oil is used, from said cap 25 and clearance 26 and conveys said oil downward to the channel 28 formed in the top wall of cylinder 21 from whence said oil is drained through the duct 29 to the lower portion of cylinder 21 and passes through the perforation of screw 16 into the reservoir 10.

Slidable in the cylinder 19, and having a close sliding fit therein, is the plunger 30 which near its upper end has the shoulder 31 and is furnished with the rod 32 having the longitudinal slot 33. On the contracted portion of the plunger 30 above the shoulder 31 is secured the sleeve 34 of the enlarged head 35 the area of which is preferably larger relative to the area of the lower end of plunger 30. In order to provide for the close sliding fit of the head 35 with the wall of the outer cylinder 21, without material leakage I prefer to supply said head 35 with the exterior member 36 preferably of different metal from that of the cylinder 21.

Slidable between the rod 32 and the cylindrical neck 22, of cylinder 21, is the tubular plunger 37 which has a close sliding fit, to prevent leakage, and having the area of its lower end proportioned to the relative areas of the head 35 and the lower end of the plunger 30 as will hereafter be referred to. Provision is made for limiting the relative movement of the rod 32 and the plunger 37 by means of the pin 38 of the plunger 37 which pin is engaged in the slot 33 of said rod 32 whereby, also, the rotation of plunger 37 is transmitted to the rod or stem 32. Mounted in any suitable manner on the plunger 37 is the weight carrying disk 39 having the axially disposed stem 40 which receives the bores of the weight elements 41, 42 and 43 or any additional weights which severally or combined have a fixed relation, as to weight, to the areas of the ends respectively of the plunger 32, the head 35 and the plunger 30.

While I have no intention to limit myself to the specific or relative areas of the ends of plungers 32 and 30 and the head 35 I find that, in actual practice, it is convenient to form the plunger 30 with its lower end having an area of one-fifth (1/5) of an inch while the head 35 has an area of forty-eight twentieths (48/20) of an inch and the end of plunger 37 an area of three twentieths (3/20) of an inch.

Communicating with the lower portion of cylinder 19 is the inlet pipe 44 having the valve 45 and the outlet or testing pipe 46, a portion of which is preferably flexible and has the connection 47 adapted to be connected with the fitting $a$ of the gage $b$ which is to be tested. Communicating with the lower portion of the cylinder neck 22 is the inlet or supply pipe 48 having the valve 49 and said pipes 44 and 48 are connected at points beyond their valves from their respective cylinders 19 and 22 by the elbow 50 which communicates with a suitable fluid supply pump having the duct 55 as shown in Fig. 5.

The pump preferably used with this device has the base 51 securely mounted on the plate 12 and having the ducts 52 and 53, of which duct 52 has the tube 54 extending into the reservoir 10 while duct 53 communicates with duct 55 which in turn is connected with the elbow 50. The wall 56 of the base 51 is cylindrical and, rotatably located within the lower portion of said wall is the valve carrier member 57 having the vertical stem 58 and having ducts 59 and 60 adapted to be brought, by the rotation of said carrier member 57, into registry with either of said ducts 52 and 53 of said base 51. The fluid flowing upward through the duct 59 under suction is prevented from escaping downward through the same duct by the flap valve 61 which is operatively mounted above the end of said duct but is free to pass downward through duct 60 to duct 53 and thence through duct 55 as valve 62 is operatively mounted in a recess at the lower side of said carrier and opens downward above the end of duct 53.

Valve carrier 57 is held from upward movement by the cylinder 64 having the centrally apertured top 65 furnished with the tubular slotted post 66 and said cylinder is secured in place by the collar 67 screwed to the wall 56. Slidable in the cylinder 64 is the piston head 68 having the tubular stem 69 which is operatively connected with the lever 70 by screws extending through the slots in post 66 while said lever is pivotally connected with the bracket 71 mounted on the cylinder top 65 or some other fixed portion of the pump and is furnished with the handle 72.

Provision is made for rotating the valve carrier 57 by means of its rod or stem 58 by providing the upper end of said rod or stem with the handle 73, by this means the carrier 57 may be rotated to transpose the positions of its ducts 59 and 60 relative to the ducts 52 and 53 of the pump base 51 whereby, with the duct 59 in registry with duct 53 and duct 60 in registry with duct 52, the operation of the pump will effect the drawing in of fluid in the elbow 50, or the parts connected therewith, through ducts 55, 53 and 59 to the upper surface of said carrier and, on the return stroke of the piston head, to discharge such drawn in fluid through ducts 60 and 52 into reservoir 10. Thus the pump may be used either to force fluid into the cylinders 19 and 22, through the connecting pipes, or to withdraw fluid from said cylinder.

While I do not limit myself to the use of any kind of fluid or to the fluidity of the same I prefer to supply the reservoir with oil of some kind and when so supplied the machine is conveniently portable as the preferred size of the same is not necessarily greater than that shown in the drawing but it may be larger or smaller without departing from my invention. The weights 41, 42 and 43 of course can be removed when the machine is to be transported.

With the pipe 46 connected with the gage to be tested I prefer to open valve 45 and close valve 49, I then operate the pump to force fluid from reservoir 10 through pipe 44 into cylinder 19 and thence through pipe 46 until said pipe 46 is filled and plunger 30 is forced upward to the position shown approximately in Fig. 1 and, until the pressure of the fluid is sufficient to act on the gage mechanism and to exert a slight pressure thereon sufficient to be registered as an initial pressure and preferably ten pounds or less. The valve 45 is then closed and valve 49 is opened whereupon the continued operation of the pump forces the fluid through pipe 48 into cylinder 22 until the tubular plunger 37 is moved upward by such pressure until its pin 38 meets the end of the slot 33 in the stem 32 of plunger 30. While the pumping may be continued and, as a result, the fluid under greater pressure between the head 35 and the end of plunger 37 may cause the head 35 to move downward and thereby through pressure of plunger 30 on the fluid in cylinder 19 cause an increase of initial pressure this is preferably avoided by stopping the pump. The valve 49 is now closed.

It will now be apparent that pressure exerted downwardly on the tubular plunger 33 will be transmitted first by the fluid under pressure between the small area of plunger 33 and the larger area of head 35 and second under the movement of said head 35 and its plunger 30 to the fluid in cylinder 19 and pipe 46. It will also be apparent that such pressure might to some extent, be resisted by the friction between the several moving parts fitting closely to their several cylinders, particularly as regards the wall of head 35 but I find that such frictional resistance is practically overcome by slowly rotating the same manually either by taking hold of the exposed portion of the plunger 37 or by placing on said plunger the weight holder 39 and causing that to slowly rotate until all necessary weight elements have been added.

The weights 41, 42 and 43 or others are proportioned with relation to the compression exerted or to be exerted by plunger 30 through the increase between the relative areas of the head 35 and the end of the plunger 37 so that comparatively a light weight placed on the weight carrier will ultimately effect the registration of proportionately a high pressure by the gage under test. With the plungers 30 and 37 and the head 35 of the dimensions above noted I find that a weight of twenty (20) ounces will exert a pressure on the gage of one hundred (100) pounds and if the gage is correctly adjusted and in good condition said pressure will be accurately registered thereby, as the multiplication of the standard weight 41, for instance, by the relative areas of the plungers 30 and 37 and the head 35 is as 80×20 ozs. or 1600 ozs. which will be registered as 100 pounds by the gage. These particular amounts are, however, merely illustrative and are not restrictive.

After the testing operation has been completed I open the valves 45 and 49 and rotate the valve carrier of the pump by swinging the handle 73 to transpose the position of the valves 61 and 62 and their related ducts. The pump is then operated with the result that the oil or other fluid contained in the cylinders 19 and 22 and in the pipes 44, 46 and 48 is drawn out by the pump and forced into the reservoir 10. At some point in such operation the pipe 46 is detached from the gage.

While I have herein shown and described particular mechanism by which my invention is or may be carried into practice it is not my intention to limit my invention except as herein claimed.

Having thus described my invention I claim as new and desire to secure by Letters Patent—

1. A pressure testing device comprising a series of vertically disposed rotatable and relatively slidable piston members all movable in the same direction under pressure and means for rotating all of said members in unison.

2. A pressure testing device comprising a series of superposed cylinders of different diameters, a series of compression piston members rotatable and slidable therein and closely fitting said cylinders, two of said members having a relative movement in the same direction under pressure and means for rotating said relatively movable members in unison.

3. A pressure testing device comprising a pair of superposed cylinders of different diameters, a pair of pressure members slidable in unison in their respective cylinders, means for rotating said pair of members including a third pressure member, and a cylinder in which said third pressure member is slidable independently of said pair of members, all of said members adapted to move in one direction under pressure applied to said third member.

4. A pressure testing device comprising a pair of superposed cylinders of different diameters, a pair of members having a close sliding fit in said cylinders and independently movable vertically and connected to rotate in unison.

5. A pressure testing device comprising a pair of superposed cylinders of different diameters opening the one into the other, a plunger head slidable in the larger of said cylinders, a plunger slidable independently in the smaller of said cylinders, a pressure member operated through the movement of said plunger head and of less area than said head and means for effecting rotation of said plunger head.

6. A pressure testing device comprising a cylinder of comparatively large diameter having a cylindrical extension of relatively small diameter, a small cylinder disposed in said large cylinder, a plunger slidable in said small cylinder, a plunger head fixed to said plunger and slidably fitting said large cylinder, and a plunger operating independently of said plunger head in said cylindrical extension.

7. A pressure testing device comprising a cylinder, a second cylinder embracing said first cylinder and having a superposed contracted cylindrical extension, a plunger slidable in said first cylinder, a head having a close sliding fit with said second cylinder connected with said plunger, a plunger slidable in said cylindrical extension independently of said head, and means for limiting the movement of said last mentioned plunger.

8. A pressure testing device comprising means for confining a body of fluid, a series of movable mechanical means for multiplying the pressure of a standard weight through displacement of said fluid and means for effecting positive rotary movement of all of said mechanical means.

9. A pressure testing device comprising means for confining two bodies of fluid of which one of said confining means is adapted to be connected with the device to be tested, a pair of relatively movable mechanical elements operatively associated with one of said confining means for multiplying the pressure of a standard weight through displacement of fluid, a third fluid displacing means acting on the fluid in the other of said confining means and means for effecting positive rotary movement of said pair of elements to reduce friction between the same and their confining means.

10. A pressure testing device comprising three slidable plungers connected for unitary rotation, means for confining fluid with reference to two of said plungers, and means for supplying fluid to said confining means, one of said plungers having a guide on which another of said plungers is slidable.

11. A pressure testing device comprising a vertical cylinder adapted to be connected with the device to be tested, a second cylinder embracing said first cylinder and extending thereabove and having a contracted cylindrical extension, means for supplying fluid to said first cylinder and to said cylindrical extension, a plunger slidable in said first cylinder, a head slidable in said second cylinder and operatively connected with said plunger, and a plunger slidable in said cylindrical extension.

12. A pressure testing device comprising a cylinder, a second cylinder partially embracing said first cylinder and having a contracted cylindrical extension, a plunger operating in the first cylinder and having a rod extending through said cylindrical extension, a head slidable in said second cylinder and mounted on said plunger, and a second plunger slidable on said rod of said first plunger above said head.

13. A pressure testing device comprising a cylinder, a second cylinder of larger diameter extending above said first cylinder and having a cylindrical extension, means for supplying fluid to said first cylinder and to said cylindrical extension, a plunger slidable in said first cylinder and having a rod extending through said cylindrical extension, a head fitting said second cylinder and fixed to said plunger, and a tubular plunger slidable in said cylindrical extension and embracing said rod.

14. A pressure testing device comprising a base having a cylinder open at its upper end, fluid supply delivery pipes communicating with said cylinder, a second cylinder mounted on said base and embracing said first cylinder and having a contracted cylindrical extension, a plunger slidable in said first cylinder and having a rod extending through said cylindrical extension, a head fixed to said plunger and fitting said second cylinder, and a plunger slidable on said rod in said cylindrical extension, the displacement of said second plunger being relative to the area of said head and to the displacement of the first plunger whereby pressure on said second plunger is multiplied on the fluid in said first cylinder.

15. A pressure testing device comprising a pair of cylinders in approximate alinement, plungers operating independently in said cylinders, means for multiplying the pressure exerted by one of said plungers on the other thereof, and means for supplying fluid to said cylinders and means for changing the operation of said fluid supply means to draw fluid from said cylinders.

16. In a fluid pressure testing device the combination therewith of a reservoir, a pump casing mounted on the reservoir and having supply delivery ducts, means for connecting the delivery duct with said fluid testing device, a valve carrier rotatable in said pump casing having valves appertaining to said ducts and an upwardly extending rod, a plunger slidable in said casing above said valve carrier, and means for operating said plunger.

17. A portable pressure testing device comprising means for confining two bodies of fluid, a flexible tube for connecting one of said confining means with the device to be tested, a pair of relatively movable mechanical elements operatively associated with one of said confining means for multiplying the pressure of a standard weight through displacement of fluid, a third fluid displacing means acting on the fluid in the other of said confining means, a pump, supply pipes leading from said pump to both of said fluid confining means.

18. A portable pressure testing device comprising superposed means for confining two bodies of fluid of which means one has a tube adapted to be connected with the device to be tested, a pair of relatively movable mechanical elements operatively associated with one of said confining means for multiplying the pressure of a standard weight, a fluid displacing weight sustaining member acting on the fluid in the other of said confining means, and means for draining the fluid from said confining means to permit said elements and said weight member to be received by said confining means to facilitate transportation of the device.

RICHARD C. COX.

Witnesses:
HENRY J. MILLER,
ESTHER C. MURPHY.

Copies of this patent may be obtained for five cents each, by addressing the "Commissioner of Patents, Washington, D. C."